United States Patent [19]

Magnaghi et al.

[11] 4,014,994
[45] Mar. 29, 1977

[54] PROCESS FOR THE RECOVERY AND PURIFICATION OF PARTRICIN

[75] Inventors: Sergio Magnaghi, Milan; Eustorgio Felci, Pogliano Milanese (Mi); Rodolfo Ferrari, Milan, all of Italy

[73] Assignee: SPA-Societa Prodotti Antibiotici S.p.A., Milan, Italy

[22] Filed: Aug. 29, 1975

[21] Appl. No.: 609,147

[30] Foreign Application Priority Data

Aug. 29, 1974 United Kingdom ............ 37773/74

[52] U.S. Cl. ................................ 424/123; 424/122
[51] Int. Cl.$^2$ .......................................... A61K 35/00
[58] Field of Search ........................... 424/123, 122

[56] References Cited

UNITED STATES PATENTS

| 3,773,925 | 11/1973 | Bruzzese et al. | 424/122 |
| 3,780,173 | 12/1973 | Bruzzese et al. | 424/122 |

*Primary Examiner*—Albert T. Meyers
*Assistant Examiner*—Daren M. Stephens
*Attorney, Agent, or Firm*—Wenderoth, Lind & Ponack

[57] ABSTRACT

The present invention is concerned with a new and improved process for the recovery of the polyene antibiotic partricin, wherein a surface-active agent is added to a fermented liquor containing partricin in an amount sufficient to bring the partricin into solution, whereafter insoluble material is removed and the partricin is recovered from the aqueous solution.

9 Claims, No Drawings

PROCESS FOR THE RECOVERY AND PURIFICATION OF PARTRICIN

BACKGROUND OF THE INVENTION

In U.S. Pat. No. 3,773,925, there is described and claimed the new polyene antibiotic partricin and a process of fermentation, extraction and purification for this new antibiotic. This antibiotic has a considerable antifungal and antiprotozoal activity.

According to the process described and claimed in U.S. Pat. No. 3,773,925, at the end of the fermentation stage, a tetracycline-type antibiotic which is produced simultaneously is extracted by acidifying the medium and filtering the aqueous phase which contains practically all the tetracycline-type antibiotic. At this stage, it is possible to extract the partricin from the mycelium by means of an appropriate solvent in which the antibiotic is soluble; in a typical process, the moist mycelium, containing diatomaceous earth or other filter aid, is suspended in butanol (about 100 – 400 liters butanol per 100 kg. of mycelium). The suspension is then adjusted, while stirring, to pH 9.2 – 10.2 by adding ammonium hydroxide or other appropriate base.

The mycelium is then removed by filtration and the butanolic solution of partricin is washed twice with a 5% aqueous solution of ethylenediamine-tetraacetic acid, previously adjusted to pH 9.8 with ammonium hydroxide.

After separating the aqueous phase, the butanolic solution is concentrated to a small volume (1/20 to 1/25 of the initial volume) at a reduced pressure and at a temperature no greater than 40° to 45° C. Partricin then crystallises out after cooling the solution.

In addition to butanol, the above-mentioned Patent also describes the use of other solvents, for example acetone, dimethyl sulphoxide, ethanol and the like.

It is known that the use of solvents for the extraction and purification of antibiotics on an industrial scale gives rise to a number of problems, both technical and economic. The installations needed to view of the inflammability and explosiveness of many organic solvents and organic solvent mixtures which are commonly employed must be of the anti-explosion type and considerable precautions have to be taken during the entire process of manufacture, especially if large volumes of solvents are used. At the end of the process, the solvents must be recovered, because of their extremely high cost, and rectified in installation, which are also expensive, and finally re-used.

Therefore, the initial cost of solvents and complex plant, the precautions, the storage of solvents, as well as the inevitable losses during processing, are all factors which have a marked adverse effect on the cost of the industrial process.

It is an object of the present invention to provide a new method for the extraction and purification of partricin which provides both practical and economic advantages.

The principal difficulty encountered in the extraction of polyene antibiotics from fermentation liquors is the low solubility of such antibiotics in most common organic solvents and their virtual insolubility in water.

Partricin is practically insoluble in water, is very sparingly soluble in most common organic solvents used on an industrial scale but is soluble in dimethylformamide, dimethylsulphoxide, dimethylacetamide and in pyridine, although not in very high concentrations.

The methods of extracting polyene antibiotics previously described in the literature are based mainly on the use of solvents which are miscible or immiscible with water and which almost always have a density lower than that of water, these solvents being added to the entire liquor or, more frequently, to the mycelium separated from the aqueous phase.

n-Butanol is the solvent which is usually preferred. When the extraction has been carried out, the solvent is generally separated from the exhausted mycelium and concentrated under reduced pressure to a small volume.

This latter operation is frequently preceded and followed by other extraction treatments, the purpose of which is to eliminate the greater part of the impurities present.

It is obvious that the extraction of large volumes of mycelium with solvents in which this class of antibiotics is not very soluble necessarily requires the use of large volumes of the solvents themselves.

The concentration of the extracts and the removal of the solvent impregnating the exhausted mycelium also constitute and economically disadvantageous feature in industrial production.

Such considerations, which also apply to the process of extracting the antibiotic partricin, have induced us to look for an alternative process which permits the use of considerably smaller volumes of organic solvents.

SUMMARY OF THE INVENTION

The new process according to the present invention broadly consists in bringing the antibiotic into solution in the aqueous phase by means of a sufficient quantity of surface-active agent, which may be anionic or cationic, although anionic is preferable, whereafter the exhausted mycelium, which does not contain solvents, is removed by filtration or centrifuging. The partricin can then be recovered from the aqueous filtrate by one of the following processes:

DETAILED DESCRIPTION OF THE INVENTION

Process A

By the addition of salts of alkaline earth metals or of other metals, the surface-active agent and the partricin present in solution are precipitated. The precipitate can be isolated by filtration, centrifuging or by the addition of a small volume of a solvent which is denser than water, which makes it possible to decant off practically the whole of the aqueous phase which does not contain partricin.

The surface-active agent may be eliminated from this precipitate either directly by treatment with solvents, a wide variety of which can be used for this purpose, or by treatment with at least equimolecular quantity of a surface-active agent of the opposite type, i.e., cationic when an anionic surface-active agent has been used initially, whereafter the complex can be extracted with solvents.

The crude product thus obtained is then purified by dissolving it in an appropriate solvent, for example dimethylformamide, formamide, dimethylacetamide, dimethylsulphoxide, pyridine or a mixture thereof or a mixture with other solvents, for example methanol, ethanol, methyl ethyl ketone or the like, preferably at elevated temperature (40° to 80° C.), followed by reprecipitation with an insolubilising agent, for example water, acetone, diethyl ether or the like.

Alternatively, the final purification can be accomplished by dissolving the crude product in an aqueous mixture of an organic solvent, for example acetone, methanol, ethanol, 2-methoxyethanol, 2-ethoxyethanol or the like, using an organic base, preferably triethylamine, at a temperature of up to 70° – 80° C. and preferably in the presence of a complexing agent, for example ethylenediaminetetraacetic acid, separating the impurities by filtration and precipitating the partricin from the filtrate by adjusting the pH to 3 – 8 with an organic or mineral acid, for example acetic acid, hydrochloric acid or the like.

The partricin obtained by these processes possesses a high degree of purity and is free from significant contaminations.

The bulk of the surface-active agents used can be recovered and re-used.

Process B

The aqueous filtrate is treated with at least 5% and usually about 10% by volume of a solvent which is immiscible with water and with an at least stoichiometrical quantity of surface-active agent having a charge opposite to that of the surface-active agent used for the extraction.

Various solvents can be used, either with a density lower than that of water, for example methyl isobutyl ketone, ethyl acetate, butyl acetate or the like, or with a higher density, for example chloroform, carbon tetrachloride, methylene chloride or the like. Although the pH is not an essential condition, it is preferable to operate in a moderately acid medium (ph 3 – 6).

After a short period of agitation, the phases are allowed to separate for a few hours; the aqueous phase, which contains practically no partricin, is removed, whilst the emulsified organic phase is centrifuged.

The semi-solid cake is suitably washed with the same solvent as that used for the extraction or with a similar solvent, so as to eliminate the major part of the equimolecular complex of the two surface-active agents, after which it is brought to solidification in acetone or in some other water-soluble solvent. After filtration, a crude product is obtained with a partricin content of 30 to 50% which can be purified as described above for process A. The two surface-active agents used can be recovered in good yields and used again.

Although a wide range of cationic surface-active agents, for example alkyl aryl ammonium salts, can be used, the best results have been obtained by using anionic surface-active agents, for example alkali metal alkylsulphates and, in particular, salts of lauryl-sulphonic acid. The quantity of surface-active agent necessary to obtain a satisfactory extraction is usually from 10 to 40 g. per liter of fermentated liquor. The optimum pH value is from 9 to 11, bearing in mind also that, in this pH range, partricin has its best stability.

The cationic surface-active agent to be used to neutralise the lauryl sulphate can be, for example, a commercially-available product, for example one of the trimethyl alkyl ammonium chlorides known as "Arquads" ("Arquad" is a Registered Trade Mark) or one of the benzalkonium chlorides or the like.

The neutralisation of the surface-active agent present with one of the opposite type must be preceded by a titration of the solution or of the intermediate with the surface-active agent to be used for the neutralisation itself. Standard analytical techniques which can be used for this purpose are described, for example, in J.Soc.Chem.Inc., 67, 45/1948; Yakagaku Zasshi, 79, 522/1959 (see also Chemical Abstracts, 69,1752 c.d.e./1968) and Deut. Textiltech., 17, 303/1967.

The cationic surface-active agent is generally used in slight excess.

The following Examples are given for the purpose of illustrating the present invention:-

EXAMPLE 1

6,000 liters of fermented liquor with a partricin activity of 5,500 U/ml are treated with 180 kgs. of sodium lauryl sulphate and sodium hydroxide is added until the pH is 10.3. After stirring for 30 minutes, 200 kgs. of filter aid ("Dicalite" 478 or "Randalite" W 19) ("Dicalite" and "Randalite" are Registered Trade Marks) are added, followed by filtration on a rotary filter with a filtering area of 11 m$^2$.

6,550 liters of filtrate are obtained with an activity of 4,470 U/ml. Extraction yield: about 89% (amount of partricin in the filtrate 29.27 kgs.).

6,500 liters of filtrate (corresponding to 29.05 kgs. of partricin) are cooled to 5° – 7° C. and 130 kgs. of calcium chloride (calculated as 100%) are added thereto. After stirring for one hour, 650 liters of chloroform are added, stirring is continued for 30 minutes and the batch then left to stand overnight at 5° – 7° C.

About 6,000 liters of the upper aqueous phase are discarded. This has an activity of about 100 U/ml.

The lower chloroform phase is warmed to 25° C., mixed with 295 liters of a 50% aqueous solution of benzalkonium chloride and stirred for one hour, whereafter it is centrifuged in a hydro-extractor. The activity of the centrifuged solvent is 350 U/ml. and that of the centrifuged aqueous phase is 150 U/ml.

The semi-solid cake is suspended in 500 liters of fresh solvent, the suspension is centrifuged again and the cake obtained is re-suspended in 500 liters of actone.

After centrifuging again and washing with 150 liters of acetone, the cake is dried under reduced pressure. 65.7 kg. of dry product are obtained with an activity of 420 U/mg.

EXAMPLE 2

9,000 liters of fermented liquor with an activity of 6,150 U/ml. are treated with 270 kg. of sodium lauryl sulphate and sodium hydroxide until the pH is 10.3.

After agitating for 30 minutes, 300 kg. of filter aid (for example "Dicalite" 478 or "Randalite" W 19) are added, followed by filtration through a rotary filter with a filtering area of 11 m$^2$.

8,470 liters of filtrate are obtained with an activity of 5,640 U/ml. Extraction yield: about 90% (partricin content of the filtrate 49.8 kgs.).

To 8,700 liters of filtrate (corresponding to 49.068 kgs. of partricin) are added 432 liters of a 50% aqueous solution of benzalkonium chloride and 652 liters of chloroform.

The pH is lowered to 4.5 by adding acetic acid, followed by stirring for 20 minutes, whereafter the batch is left to stand overnight. About 7,000 liters of the upper aqueous phase are discarded. This has an activity of about 160 U/ml. The lower emulsified phase is centrifuged in a hydro-extractor, the cake being washed well with chloroform (activity of centrifuged solvent 978 U/ml.). The product discharged from the centrifuge (700 kgs. = 500 liters) is stirred with 350 liters of fresh solvent. The suspension is centrifuged again, the treatment is repeated and the cake is re-suspended in 300 liters of acetone. After further centrifuging, the cake is dried under reduced pressure. 94.86 kgs. of dry product are obtained with an activity of 450 U/mg. (42.69 kgs./activity).

EXAMPLE 3

To 100 liters of dimethyl formamide are added 10 kgs. of the intermediate obtained from Example 1 (partricin content 4.2 kgs.). After agitating for one hour, it is filtered in a filter press and the cake is washed repeatedly with dimethylformamide. To the combined filtrate and washings are added 500 liters of water, whereafter the batch is cooled to 10° C. and then stirred overnight. It is filtered through a vacuum filter and the solid is washed several times with distilled water and then with acetone. Finally, the product is dried at ambient temperature in vacuo. 3.74 kgs. of pure partricin are obtained with a titre of 1010 U/mg.

EXAMPLE 4

To 200 liters of dimethylformamide there are added, at 50° C. 25 kgs. of the intermediate obtained from Example 2 (corresponding to 11.250 kgs. of patricin). After stirring for one hour, it is filtered by means of a filter press and the cake is washed repeatedly with dimethylformamide. 1,000 liters of acetone are then added to dimethylformamide filtrate. Precipitation is completed by cooling to about 10° C., followed by agitating for 3 to 5 hours. After filtration through a vacuum filter, the solid is washed repeatedly with acetone and then with diethyl ether, the product finally being dried in vacuo at ambient temperature. 9.6 kgs. of partricin are obtained with a titre of 1,045 U/mg.

EXAMPLE 5

2 kgs. of disodium ethylenediamine tetraacetate are dissolved in 20 liters of distilled water. 4 kgs. of the intermediate from Example 1 (1.68 kgs. of partricin) are added thereto and the batch is rendered alkaline (pH 10.5) by adding sodium hydroxide. 20 liters of acetone are then added, followed by the slow addition of 6.7 liters of triethylamine, accompanied by vigorous agitation. The batch is filtered in a filter press and washed several times with 50% aqueous acetone. The filtrate and washings are cooled to 4° – 5    C. and 20% hydrochloric acid then added slowly until the pH is 6.0. The precipitation of the partricin is completed after 2 hours of agitation at 4° – 5° C. It is filtered off through a vacuum filter, washed several times with 50% aqueous acetone and finally with pure acetone. The product is dried at ambient temperature in vacuo. 1.37 kgs. of partricin are obtained with a titre of 1100 U/mg.

EXAMPLE 6

To a suspension of 1 kg. of the intermediate obtained from Example 2 (corresponding to 0.450 kg.of partricin) in 7.5 liters of 50% aqueous acetone, there is slowly added, at a temperature of 45° C., 1.8 liters of triethylamine, with vigorous agitation. The batch is filtered in a filter press and the cake is washed repeatedly with 50% aqueous acetone.

The combined filtrate and washings are cooled to 4° C. and 20% hydrochloric acid is slowly added until the pH is 6. The precipitation of the partricin is completed by stirring the suspension at 4° to 6° C. for at least 2 hours. The suspension is filtered through a vacuum filter and the solid is washed repeatedly with 50% aqueous acetone and finally with pure acetone. The product is dried at ambient temperature in vacuo. 0.346 kg. of partricin are obtained with a titre of 1170 U/mg.

We claim:

1. A process for the recovery of partricin from a fermented liquor containing said partricin, which comprises adding a surface-active agent selected from the group consisting of a cationic alkyl aryl ammonium salt and an anionic alkali metal alkyl sulphate to the fermented liquor in an amount of from 10 to 40 g of the surface-active agent per liter of the fermented liquor at a pH of from 9 to 11, removing insoluble material from the resultant mixture and isolating the partricin from the resultant aqueous solution.

2. A process according to claim 1, wherein the surface-active agent is a cationic alkyl aryl ammonium salt.

3. A process according to claim 1, wherein the surface-active agent is an anionic alkali metal alkyl sulphate.

4. A process according to claim 1, wherein the partricin is isolated from the aqueous solution by precipitating the partricin with an alkaline earth metal salt, and the surface-active agent is removed from the precipitated partricin by treatment with a solvent or at least at equimolecular quantity of a surface-active agent having a charge opposite the charge of the surface-active agent initially added to the fermented liquor.

5. A process according to claim 1, wherein the partricin is isolated from the aqueous solution at a pH of from 3 to 6 by adding to the aqueous solution (1) at least 5% by volume of a solvent which is immiscible with water and (2) at least a stoichiometric quantity of a surface-active agent having a charge opposite the charge of the surface-active agent initially added to the fermented liquor.

6. A process according to claim 1, wherein the isolated partricin is purified by dissolving the isolated partricin in a solvent and reprecipitating the partricin by the addition of a non-solvent for the partricin to the resultant solution.

7. A process according to claim 1, wherein the isolated partricin is purified by dissolving the isolated partricin in an aqueous organic solvent, together with an organic base, at a temperature of 70° – 80° C., separating impurities from the resultant mixture by filtration and precipitating the partricin from the filtrate by adjusting the pH of the filtrate to 3 – 8.

8. A process according to claim 7, wherein the aqueous organic solvent further contains ethylenediaminetetraacetic acid as a complexing agent.

9. A process according to claim 1, wherein the isolated partricin is purified by dissolving the isolated partricin in an aqueous organic solvent, together with triethylamine, at a temperature of 70° – 80° C., separating impurities from the resultant mixture by filtration and precipitating the partricin from the filtrate by adjusting the pH of the filtrate to 3 – 8 by adding to the filtrate an acid selected from the group consisting of acetic acid and hydrochloric acid.

* * * * *